United States Patent [19]

Steinkuhl et al.

[11] Patent Number: 4,616,671
[45] Date of Patent: Oct. 14, 1986

[54] VALVE WITH FLOW FORCE COMPENSATOR

[75] Inventors: Allan R. Steinkuhl, West Lafayette; Steven D. Cayton, Lafayette, both of Ind.

[73] Assignee: TRW Inc., Cleveland, Ohio

[21] Appl. No.: 574,403

[22] Filed: Jan. 27, 1984

[51] Int. Cl.⁴ .............................................. F15B 13/06
[52] U.S. Cl. .................................... 137/101; 137/118; 60/422
[58] Field of Search ................... 137/118, 119, 101; 91/516; 60/422

[56] References Cited

U.S. PATENT DOCUMENTS

| | | | |
|---|---|---|---|
| 3,355,994 | 12/1967 | Malott | 91/412 |
| 3,914,939 | 10/1975 | Purdy | 60/422 |
| 3,916,932 | 11/1975 | Thorson | 137/101 |
| 3,979,907 | 9/1976 | Paul | 60/422 |
| 4,488,569 | 12/1984 | Rau | 137/101 |

Primary Examiner—Alan Cohan
Attorney, Agent, or Firm—Yount & Tarolli

[57] ABSTRACT

A valve that directs flow from an inlet to at least two outlets, and which counterbalances flow induced forces that tend to restrict flow to one of its outlets. The valve has a valve chamber formed in a housing, and the inlet communicates fluid to the valve chamber. A valve member is movable in the valve chamber to communicate fluid from the inlet to the two outlets. The valve member has a land which fluid flows across as the fluid flows from the inlet to one of the outlets, and the fluid flowacross that land creates a force which acts on the valve member urging the valve member in a first direction in which flow across the land to the one outlet is restricted. Means communicates fluid pressure from the other outlet to the valve member to apply a force to the valve member that urges the valve member in a second direction that is opposite the first direction, to counterbalance the flow induced forces on the valve member.

9 Claims, 4 Drawing Figures

VALVE WITH FLOW FORCE COMPENSATOR

BACKGROUND OF THE INVENTION

This invention relates to a valve which directs fluid flow from an inlet port to a pair of outlet ports. The invention relates particularly to a priority valve which divides fluid flow from a pump between a vehicle steering circuit and an auxiliary fluid power circuit.

A known priority valve for dividing fluid flow between a vehicle steering circuit and an auxiliary circuit is shown in U.S. application Ser. No. 361,851, filed Mar. 25, 1982, and is assigned to the assignee of this invention. The known priority valve includes a movable valve spool which controls fluid flow to the vehicle steering circuit and the auxiliary fluid power circuit. The valve spool is spring biased to a priority position in which it directs all fluid from a fluid source to the steering circuit. The valve spool can move away from its priority position when a fluid pressure differential applied across the valve spool exceeds the spring bias thereon.

The fluid pressure differential on the valve spool is produced by fluid pressures in a pilot fluid circuit that branches from the priority flow communicated to the steering circuit. Fluid pressure in the pilot circuit is controlled by a hydrostatic steering controller in the steering circuit, and can vary in accordance with the steering demand (i.e. the rate at which an operator steers and the resistance encountered by the vehicle's wheels). When the fluid flow and pressure directed to the steering circuit are sufficient to effect steering as demanded by an operator, the fluid pressure in the pilot circuit causes the priority valve spool to shift away from its priority position, and direct fluid that is not needed for steering to the auxiliary circuit where it is available for operating one or more auxiliary fluid power implements (e.g. back hoe, end loader) carried by the vehicle. When flow and pressure in the steering circuit are insufficient to effect steering as demanded by an operator, the priority valve spool is rapidly returned toward its priority position, so that more fluid is made available for steering until the steering demand is satisfied.

In the system of U.S. patent application Ser. No. 361,851, the priority valve spool moves axially in a valve housing. The valve spool has lands that cooperate with surfaces of the housing to define variable size orifices for directing fluid to the steering and auxiliary circuits. The fluid flow to the steering and auxiliary circuits is across the lands that form the variable size orifices.

Applicant has found that with a valve such as disclosed in Ser. No. 361,851, when there is a high rate of flow across the lands of the valve spool to the priority port there are forces induced on the valve spool. The forces tend to urge the valve spool in a direction that restricts the priority flow. Such a condition can interfere with proper operation of a priority valve when the flow rate across the lands of the valve spool to the priority port is high and the auxiliary circuit is operating at a pressure that is significantly higher than the pressure in the steering circuit. The valve spool should assume and maintain its priority position to satisfy the steering demand, but the forces induced on the valve spool because of the increase in the pressure drop and the high rate of flow across those lands tend to urge it in a direction that restricts the flow to the priority port. Thus, the valve spool may not deliver the appropriate amount of priority flow to the steering circuit.

SUMMARY OF THE INVENTION

The present invention provides a valve in which a fluid pressure force is applied to a valve member that balances (neutralizes) the induced forces that would otherwise tend to move the valve member in a direction restricting flow to the priority outlet port.

According to the invention, the valve has a valve chamber formed in a housing, and an inlet which communicates fluid to the valve chamber. A valve member is movable in the valve chamber to communicate fluid from the inlet to at least two outlets that also communicate with the chamber. The valve member has a land which, along with the housing, defines an orifice across which fluid flows from the inlet to one of the outlets. The fluid flow across the land can induce a force on the valve member which urges the valve member in a direction tending to reduce the size of the orifice. The invention provides means which communicates fluid pressure from the other outlet to the valve member to apply a force to the valve member that opposes the induced force on the valve member, thus balancing the induced force on the valve member.

According to the preferred embodiment, a biasing spring acts on one end of the valve member and biases the valve member toward a priority position in which it directs fluid from the inlet across the land and through an orifice to the one outlet and blocks communication between the inlet and other outlet. The valve member can move away from its priority position when a differential fluid pressure applied to the valve member exceeds the biasing force of the spring. The valve member, as it moves away from its priority position, (i) progressively restricts the flow area from the inlet across the land and through the orifice to the one outlet, and (ii) establishes and then progressively increases the flow area of an orifice between the inlet and the other outlet. When the flow to the one outlet induces forces that tend to move the valve member further away from its priority position, fluid pressure from the other outlet is communicated with the valve member and acts on the valve member in opposition to the flow induced forces that act on the valve member. Thus, that fluid balances (neutralizes) the flow-induced forces that would otherwise urge the valve member away from its priority position.

BRIEF DESCRIPTION OF THE DRAWINGS

Further features of the present invention will become apparent from the following detailed description of a preferred embodiment of the present invention taken with reference to the accompanying drawings wherein.

DESCRIPTION OF PREFERRED EMBODIMENT

Figure 1:
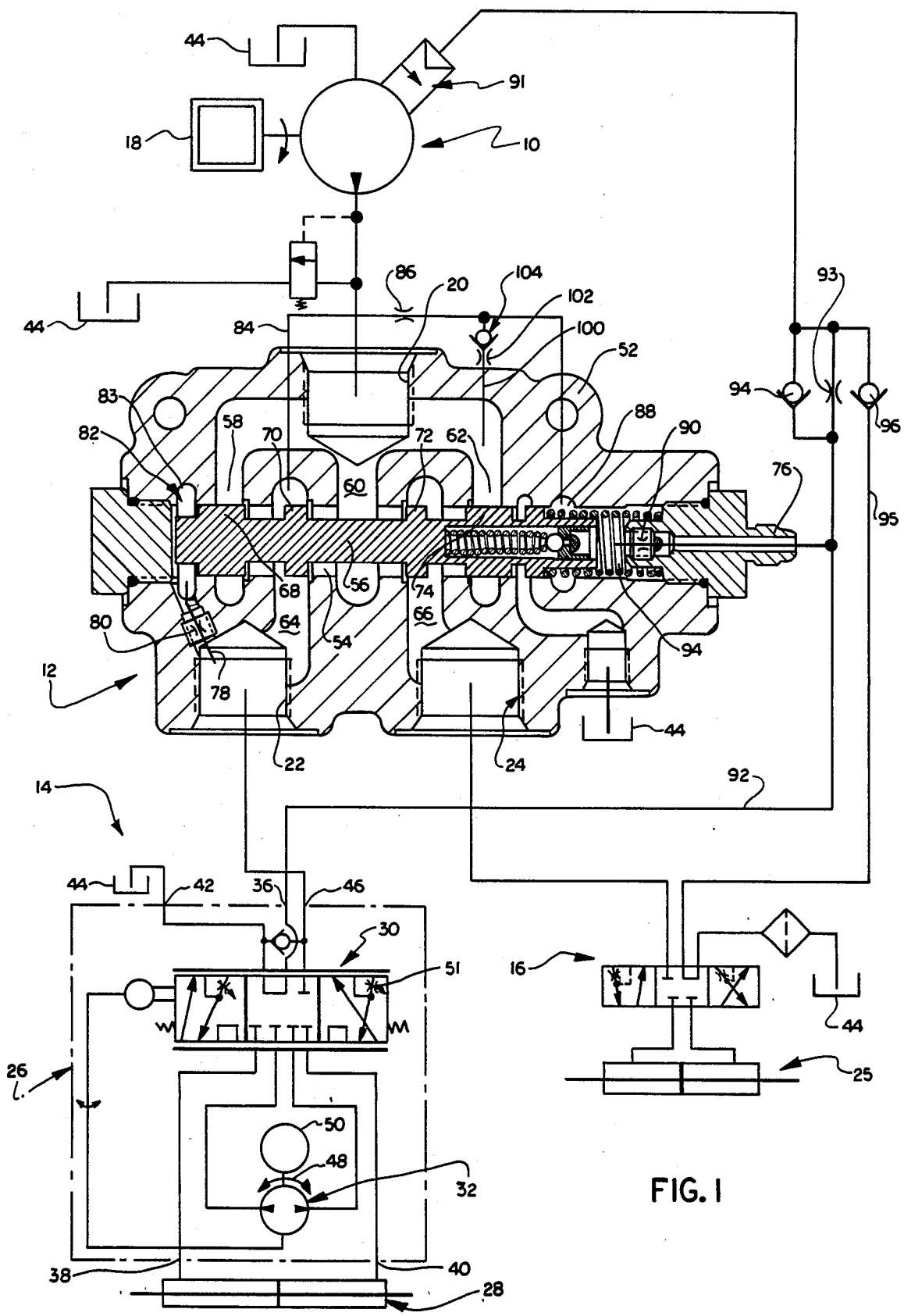
FIG. 1 is a schematic illustration of a system including a priority valve (shown in section) for directing a flow of fluid to a steering circuit and an auxiliary circuit.

FIG. 1 shows a hydrostatic vehicle steering system in which fluid from a pump 10 is directed through a priority valve 12 to a primary steering circuit 14 and an auxiliary circuit 16. The pump 10 is driven by the vehicle's engine 18 and delivers fluid to the inlet port 20 of the priority valve 12. The priority valve 12 directs the fluid that is needed for steering to a priority outlet port 22 connected to the steering circuit 14, and directs excess flow, beyond that need for steering, to an auxiliary outlet port 24 connected to the auxiliary circuit 16.

In the steering circuit 14, a hydrostatic steering controller 26, of the type disclosed in U.S. Ser. No. 243,497, meters the flow, and directs the metered flow to a steering actuator 28. In the auxiliary circuit 16, the flow from the auxlary port 24 is available to operate a actuator 25 associated with a fluid power implement such as a backhoe, loader, etc. carried by the vehicle.

The steering controller 26 is operated by the vehicle's steering wheel 50, and includes a directional control valve 30 and a positive displacement metering unit 32. The controller 26 has an inlet port 46 connected with the priority outlet port of the priority valve 22, a pair of working ports 38, 40 connected to opposite chambers of the steering actuator 28, a return port 42 connected to a reservoir 44, and a steering load sense port 36. The control valve 30 is spring biased to a neutral position in which it blocks flow from inlet port 46 to the metering unit 32. In response to a steering effort, the control valve 30 shifts away from the neutral position and to an operating position where it (i) directs fluid from the inlet port 46 to the metering unit 32, (ii) directs metered flow from the metering unit to one chamber of the steering actuator 28, and (iii) exhausts fluid from the other chamber of the steering actuator 28 to the reservoir 44.

The priority valve 12 controls flow to the steering circuit 14 and to the auxiliary circuit(s) 16. It operates to insure that during steering all flow that is needed to cause steering is made available to the steering circuit 14. When there is no steering, or when the flow and pressure to the steering circuit 14 are more than sufficient to cause the steering maneuver demanded, the priority valve 12 makes excess fluid available to the auxiliary circuit(s) 16.

During a steering manuever, the steering controller 26 provides a fluid pressure signal at its load sense port 36 which indicates a demand for flow and pressure. The signal causes the priority valve 12 to shift to its priority position (and if pump 10 is of the variable displacement type, causes the displacement of the pump 10 to increase) in order to bring flow and pressure delivered to the controller 26 to levels which are sufficient to cause the steering demanded. When no steering is taking place, the control valve 30 in controller 26 is biased to its neutral position, and the pressure at the load sense port 36 causes the priority valve 12 (and pump 10) to be in a condition in which flow and pressure communicated with the controller's inlet port 46 are maintained at minimum standby levels.

The hydrostatic controller 26 can take various forms, but is preferably the type shown and described in U.S. application Ser. No. 243,497, which is assigned to the assignee of this invention, and incorporated herein by reference. The controller 26 has a rotatable input member 48 connected to the vehicle's steering wheel 50. The metering unit 32 is of the gerotor gear type having relatively rotatable and orbital gerotor gears. The directional control valve 30 comprises a control valve member that is rotated away from a neutral position by torque transmitted through the gerotor gear metering unit 32. The control valve 30 can rotate through a range of motion away from its neutral position, and in that range of motion, the extent of its movement is proportional to the steering demand (which demand is a function of the rate the operator rotates the steering wheel 50 and the resistance to movement of the vehicle's ground wheels). As the control valve 30 rotates away from its neutral position, it first establishes a main flow control orifice 51 that communicates its inlet port 46 with the metering unit 32. Once the orifice 51 is established, its flow area varies in proportion to the extent of movement of the valve away from its neutral position. Thus, the flow area of orifice 51 varies as a function of the steering demand.

The priority valve 12 comprises a housing 52, an axially extending fluid chamber 54, and an axially movable valve spool 56 movable in the chamber 54. The housing 52 has three inlet cavities 58, 60, 62 which communicate between the valve's inlet port 20 and the fluid chamber 54. The housing 52 also has a priority outlet cavity 64 which communicates fluid chamber 54 with the priority outlet port 22, and an auxiliary outlet cavity 66 which communicates fluid chamber 54 with the auxiliary outlet port 24.

The priority valve 12 has several variable orifices that control fluid flow to the priority port 22 and the auxiliary port 24. Those orifices are formed by lands on the valve spool 56 that move relative to respective surfaces of the housing 52. A pair of lands 68, 70 on the valve spool 56 move relative to respective surfaces 68a, 70a (FIG. 2) of the housing 52 to define therewith variable orifices directing fluid from the inlet cavities 58, 60 to the priority outlet port 22. Another pair of lands 72, 74 on the valve spool 56 move relative to respective surfaces 72a, 74a (FIG. 2) of the housing 52 to define therewith variable orifices directing fluid flow from the inlet cavities 60,62 to the auxiliary outlet port 24.

Figure 2:
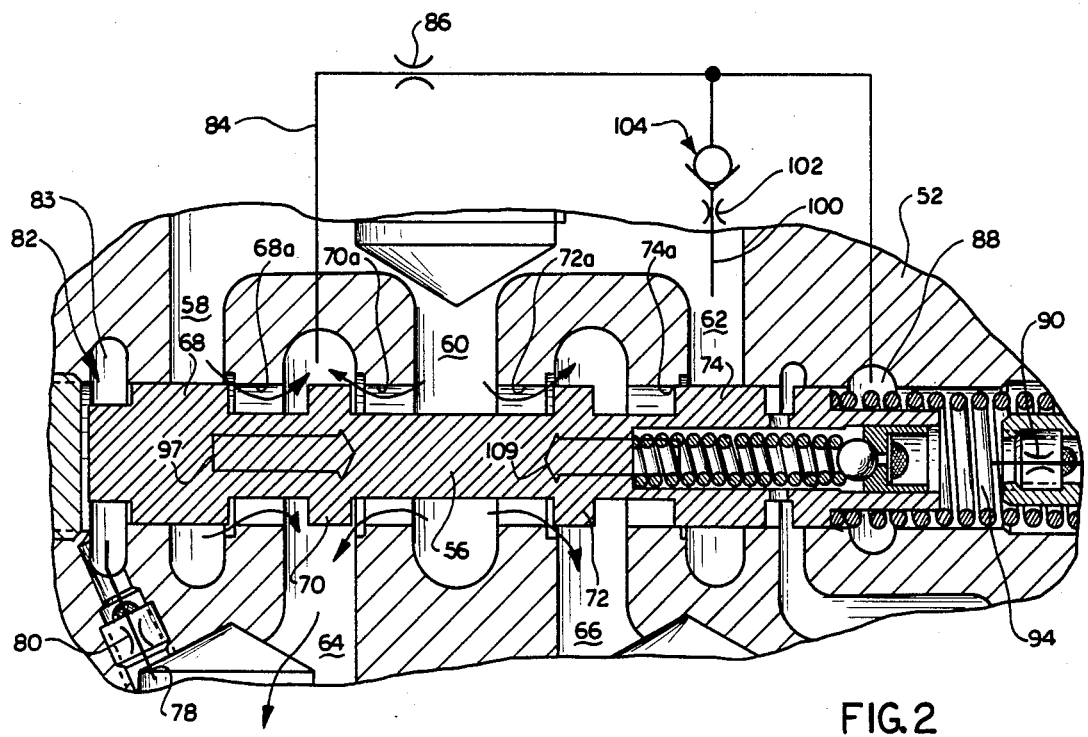
FIG. 2 is an enlarged, fragmentary, sectional illustration of a part of the priority valve showing the valve member in a position in which it is directing fluid to both of its outlet ports.

When the priority valve spool 56 is in its priority position (FIG. 3), the flow area of the orifices which communicate the inlet port 20 with the priority outlet port 22 is a maximum value, and communication between the inlet port 20, and the auxiliary port 24 is blocked by the lands 72,74. In this condition maximum flow across the lands 68, 70 to the priority port 22 is possible, and the auxiliary port 24 is blocked. As the valve spool 56 moves away from its priority position (i.e., rightward from the position shown in FIG. 3) the lands 68, 70 progressively close off the flow area of the orifices directing fluid to the priority port 22 and the lands 72, 74 establish, and progressively increase, the flow areas of the orifices directing fluid to the auxiliary port 24. In accordance with the specific teachings of U.S. Ser. No. 361,851, the lands 72, 74 are designed for a specific, staged type of movement, so that land 72 first opens to direct a small amount of flow to the auxiliary circuit, and land 74 then opens to provide larger flows to the auxiliary circuit. FIGS. 1 and 2 illustrate the valve spool in a position in which it has moved rightwardly from its priority position to a position in which there is flow across the lands 68, 70 to the priority port, and there is also flow across the land 72 to the auxiliary port.

A passageway 78, having a fixed size orifice 80, is formed in the housing 52, and communicates the priority outlet port 22 with a fluid cavity 82 at the lefthand side of the priority valve spool 56. A conduit 84 is formed in the housing 52, and communicates the fluid cavity 64, through a fixed size orifice 86, with a fluid cavity 88 on the other side of the priority valve spool 56. The fluid cavity 88 communicates through a fixed size orifice 90 with a pilot port 76 formed in the housing 52.

Figure 3:
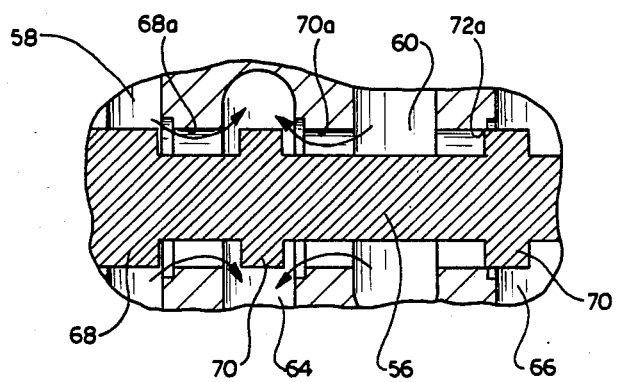
FIG. 3 is an enlarged fragmentary, sectional illustration of part of the priority valve, showing the valve member it its priority position.
Figure 4:
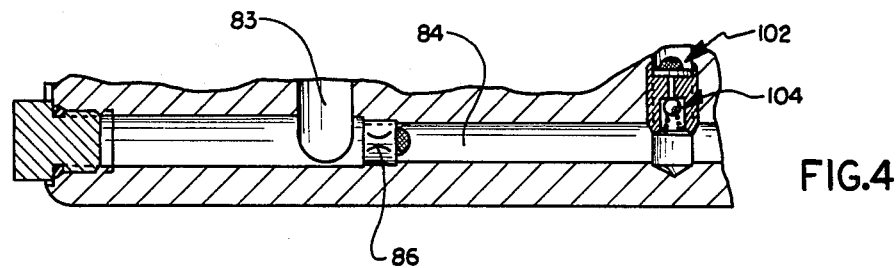
FIG. 4 is a fragmentary, sectional illustration of another part of the priority valve showing part of the pilot conduit system in the valve.

A biasing spring 94 biases the valve spool 56 toward its priority position. When there is flow in the pilot circuit, the pressures in the fluid cavities 82, 88 are different, due to the pilot flow through the fixed size orifice 86. Thus, there is a differential fluid pressure across the valve spool 56. When that differential fluid pressure exceeds the biasing force of spring 94, the valve spool 56 moves rightwardly away from the priority position of FIG. 3. As the valve spool 56 moves away from its priority position, it (i) progressively restricts the flow area of the variable orifice directing flow across the lands 68, 70 to the steering circuit 14, and (ii) establishes and then progressively increases the flow area(s) of the variable orifices communicating fluid flow across the land(s) 72 (74) and to the auxiliary circuit 16. When the fluid pressure differential does not exceed the spring force, the spring 94 biases the valve spool 56 to its priority position (FIG. 3).

In the steering circuit 14, the pilot port 76 communicates with a conduit 92 that leads to the load sense port 36 of the hydrostatic steering controller 26 in the steering circuit. Normally, if there is no steering, the fluid at the load sense port 36 flows through the steering controller 26 and to the reservoir 44. The spring 94 requires a certain differential fluid pressure to exist across the priority valve spool 56 before the valve spool 56 can move away from its priority position. When that differential pressure exists, indicating there is sufficient flow in the steering circuit, the valve spool 56 can move away from its priority position, against the bias of the spring 94, to a position in which it directs fluid from the inlet 20 to both the steering and the auxiliary circuits (FIGS. 1, 2). The valve spool 56 can continue to move away from its priority position, to increase flow to the auxiliary circuit 16, as long as the differential fluid pressure exceeds the bias of spring 94. If the differential fluid pressure is high enough, the valve spool 56 can move to a position where virtually all fluid is communicated to the auxiliary circuit 16 and only a minimum standby flow and pressure is maintained in the steering circuit 14.

When an operator begins to steer, the steering controller 26 restricts the pilot flow to the reservoir 44, before the main flow control orifice 51 in the controller is established. A pressure surge is created in the pilot conduit 92. That surge communicates with pressure cavity 88, and, along with spring 94, acts on the priority valve spool 56 to urge the priority valve spool rapidly to its priority position. Thus sufficient fluid is made available to the steering circuit 14 to complete the steering maneuver.

During steering, the pilot fluid pressure in the spring cavity 88 varies in accordance with variations in the variable main flow control orifice 51 in the hydrostatic steering controller 26. As discussed above, variations in the main flow control orifice 51 are proportional to the steering demand. Thus, the flow in the pilot circuit, and the pressure in cavity 88, is proportional to steering demand. The pressure in cavity 88, along with the force of spring 94, determines the amount of fluid flow and pressure which must exist at the priority port 22 before the valve spool 56 can move away from its priority position, and begin directing fluid to the auxiliary port. Thus, the pilot fluid pressure in the spring cavity 88 is proportional to and reflects the steering demand.

The pump 10 is preferably a variable displacement swash plate pump, and the pressure signal in the pilot circuit also controls the displacement of the pump. A device is provided for adjusting the position of the swash plate of the pump depending on the fluid pressure in the pilot circuit. Pressure from the pilot conduit 92 is communicated to the device 91 through an orifice 93 and a check valve 94 that are in parallel with each other (FIG. 1). In addition, the auxiliary circuit 16 is also designed to provide a pressure signal to the device 91 that controls the displacement of the variable displacement pump. That fluid pressure signal is through a conduit 95 having a valve 96. Further, as seen from FIG. 1, the conduit 95 communicates with one side of orifice 93, so that some of the fluid in the auxiliary conduit 95 is bled to the pilot conduit 92. The foregoing concept applies the teachings of U.S. patent application Ser. No. 345,546, filed Feb. 3, 1982, entitled "Load Sense Hydrostatic Vehicle Steering System", which is assigned to the assignee of this application, and incorporated herein by reference.

When the priority valve spool 56 is directing fluid to both the steering circuit 14 and the auxiliary circuit 16, a condition may arise in which there is a need for a significant rate of flow to the steering circuit 14, but the fluid pressure required in the steering circuit is relatively low in comparison to the fluid pressure in the auxiliary circuit. Thus, there may be a significant rate of flow to the steering circuit 14, and a relatively high pressure differential between the steering circuit 14 and the auxiliary circuit 16. Applicant has found that in such a condition, the priority valve spool 56 may not respond to the demand for fluids by the steering circuit 14, due to forces on the valve spool 56 which are induced by the high pressure drop across the lands 68, 70 to the priority port 22. Specifically, if the auxiliary circuit 16 is under high pressure, there is a high pressure at the priority valve's inlet port 20. That pressure means that the pressure drop across the lands 68, 70 and to the priority port is very high. At high pressure drops across the lands 68, 70, forces are induced on the valve spool 56 that tend to urge the valve spool in a direction (depicted by the arrow 97 in FIG. 2) in which flow to the priority port 22 is further restricted. Those flow induced forces impede the ability of the priority valve to move to a position that insures a proper amount of priority flow to the steering circuit at the proper pressure drop.

In accordance with the invention, the pilot conduit system is communicated with the auxiliary port in such a way that forces will be applied to the valve spool 56 to counteract and balance (neutralize) the flow induced forces that would otherwise tend to urge the valve spool in a direction which restricts the flow to the priority port. As shown in FIGS. 1 and 2, a pilot conduit 100 is provided in the housing 52, and extends between the inlet cavity 62 and the pilot conduit 84 in pressure area 88. The conduit 100 communicates the optional inlet cavity 62 through a fixed size orifice 102, with the downstream side of the fixed size orifice 86 in the pilot conduit 84. A one-way check valve 104 is provided in conduit 100, between the orifice 102 and the pilot conduit 84 to prevent loss of pilot fluid to the auxiliary port.

Thus, the auxiliary outlet cavity 66 communicates with the pressure area 88 when the check valve 104 is open.

In the pilot conduit system, the fluid in pilot conduit 84 originates from the fluid communicated to the priority steering port 22. Thus, the pressure in pilot conduit 84, even on the downstream side of orifice 86, is related to the pressure in the steering circuit taken at the priority port 22. It changes as the pressure at the priority port 22 changes.

The orifice 102 and the check valve 104 allow fluid from the auxiliary port to be communicated to the pilot conduit 84, downstream of the orifice 86, when the pressure in the auxiliary port is sufficiently greater than the pressure in the pilot conduit to open the check valve 104 and to provide flow across orifice 102. Thus, the orifice 102 and the check valve 104 effectively sense a pressure differential that is related to the pressure differential between the auxiliary port 24 and the priority steering port 22. They communicate fluid pressure from the auxilary port 24 to the pilot conduit 84 when a predetermined pressure differential exists between the pressure at the auxiliary port 24 and the pressure at the priority port 22. When that pressure differential exists, the amount of flow and pressure in the pilot conduit 84 is likely to be insufficient to enable the valve spool to maintain a position in which it delivers adequate fluid to the priority port 22. When such a condition exists, additional flow and pressure is communicated from the auxiliary port 24 to the pilot conduit 100. The fluid pressure in the pilot conduit 84 increases, and the pressure in the cavity 88, which biases the priority valve spool 56 toward its priority position also increases. The increased pressure in cavity 88 balances (neutralizes) the forces on the valve spool that tend to urge the valve spool 56 in a direction which would restrict flow to the priority port 22. In FIG. 2, arrow 109 depicts the direction of the balancing (neutralizing) force applied to the valve spool 56.

The orifice 102 is sized, in relation to the remainder of the pilot orifice system, to allow that flow at a certain pressure differential between the steering and auxiliary circuits but which does not adversely affect pilot conduit system regulation of the valve spool 56. Also, the check valve 104 prevents flow from the pilot conduit 84 to the auxiliary port 24 when the auxiliary port 24 is operating under a lower pressure than the pressure in conduit 84.

The pilot conduit 100 may extend between the auxiliary cavity 66 or between the inlet cavity (60, 62 or 58) and the pilot conduit 84. In FIG. 1, the conduit 100 is shown extending from the inlet cavity 62.

With the invention, when there is a flow to the steering circuit, and a sufficiently large differential pressure exists between the steering and the auxiliary circuits, the pressure from the auxiliary circuit is made available to the pilot conduit system. That pressure balances (neutralizes) the flow induced forces that would otherwise tend to close the valve 56. Thus, the valve 36 should always be able to maintain a priority position to direct the intended amount of fluid to the steering circuit.

Thus, applicants have provided what is believed to be a useful way of balancing (neutralizing) flow induced forces that might otherwise impede the ability of the priority valve.

What is claimed is:

1. A valve comprising:

a housing having a valve chamber, an inlet communicating with said valve chamber, and at least two outlets communicating with said valve chamber, a valve member located in said valve chamber for controlling fluid flow from said inlet to said outlets, said valve member having a land across which fluid flows from said inlet to one of said outlets, the fluid flow across said land creating a force acting on said valve member urging said valve member in a first direction in which flow across said valve member to said one of said outlets is restricted, means for causing a balancing fluid pressure to be applied to said valve member, said balancing fluid pressure urging said valve member in a second direction that is opposite said first direction, said valve member comprising a spool that can move axially in said valve chamber in response to a differential pressure applied thereto, said differential pressure being created by a first fluid pressure force applied to a first end of said spool and a second fluid pressure force applied to a second end of said spool and urging said spool in said second direction, said means for causing a balancing pressure to be applied to said valve member including fluid conduit means communicating with the other of said outlets and for directing the balancing fluid pressure to said second end of said spool to increase the fluid pressure force on said second end of said spool.

2. A valve as defined in claim 1 including spring means acting on said second end of said spool and biasing said spool in said second direction and toward a priority position in which said spool directs fluid from said inlet across said land to said first outlet and blocks communication between said inlet and said second outlet, said differential pressure urging said spool away from said priority position and in said first direction when it exceeds the force of said spring means, said spool as it moves away from said priority position (i) progressively restricting the flow area from said inlet across said land to said one outlet and (ii) establishing and then progressively increasing communication between said inlet and said other outlet, said means communicating pressure from the other outlet with one end of said spool communicating fluid pressure from the other outlet to said second end of said spool to increase the fluid pressure on said second end of said spool, the spring means and the fluid pressure on said second end of said spool applying forces to said spool in said second direction.

3. A valve as defined in claim 1 wherein said housing includes a pilot fluid outlet and a pilot fluid circuit communicates with said pilot fluid outlet, said pilot fluid circuit comprising (i) a first fluid passage communicating said one outlet with said first end of said spool, (ii) a first orifice means in said first fluid passage, (iii) a second fluid passage communicating said first end of said spool with said second end of said spool, (iv) a second orifice means in said second fluid passage, (v) a third fluid passage communicating said second end of said spool with said pilot fluid outlet, and (vi) a third orifice means in said third fluid passage, said fluid conduit means communicating with the other of said outlets and for directing the balancing fluid pressure to said second end of said spool comprising a fourth fluid passage communicating with said second fluid passage at a location that is downstream of said second orifice means, a fourth orifice means in said fourth fluid passage, and a one-way check valve in said fourth fluid passage, said one way check valve allowing flow from said second outlet to said second passage but blocking flow from said second passage to said second outlet.

4. A valve as set forth in claim 3, wherein said first, second, third and fourth fluid passages are formed in said housing.

5. A valve as set forth in claim 4 wherein said land cooperates with a first portion of said housing to define a first variable orifice directing fluid from the inlet to said one outlet, said land and said first portion of said housing progressively restricting the flow area of said first variable orifice as said spool moves away from its priority position, said spool having a second land across which fluid flows when said spool is directing fluid from said inlet to both of said outlets, said second land cooperating with a second surface of said housing to block fluid flow from said inlet to said other outlet when said spool is in said priority position, said second land and said second surface of said housing establishing and progressively increasing the flow area of a second variable orifice directing flow from said inlet to said other outlet as said spool moves away from said priority position.

6. A valve comprising:
   a housing having an axially extending valve chamber, an inlet communicating with said valve chamber, and at least two outlets communicating with said chamber,
   a valve spool located in said valve chamber for directing fluid from said inlet to said outlets,
   said valve spool having a first land across which fluid flows from said inlet to one of said outlets and a second land across which fluid flows from said inlet to the other outlet,
   the fluid flow across said first land creating a force which acts on said valve spool urging said valve spool in a first direction in which flow across said first land is restricted and flow across said second land is increased, and
   means in said housing communicating pressure directed to the other outlet to said valve spool to apply a force to said valve spool that urges said valve spool in a second direction that is opposite said first direction.

7. A valve as set forth in claim 6 wherein said spool can move axially in said chamber according to the magnitude of a differential pressure applied thereto, said differential pressure being created by a first fluid pressure force applied to a first end of said spool and a second fluid pressure force applied to a second end of the spool and urging said spool in said second direction, said means communicating fluid pressure from the other outlet of said valve member including means in said housing communicating fluid pressure from the other outlet to one end of said spool to increase the fluid pressure force on said one end of said spool.

8. A valve as defined in claim 7 including spring means acting on said second end of said spool and biasing said spool in said second direction and toward a priority position in wich said spool directs fluid from said inlet across said land to said first outlet and said second land blocks communication between said inlet and said second outlet, said differential pressure urging said spool away from said priority position and in said first direction when it exceeds the force of said spring means, said spool as it moves away from said priority position (i) progressively restricting the flow area from said inlet across said first land to said one outlet and (ii) establishing and then progressively increasing a flow area across said second land and to said other outlet, said means communicating pressure from the other outlet with one end of said spool communicating fluid pressure from the other outlet to said second end of said spool to increase the fluid pressure on said second end of said spool, the spring means and the fluid pressure on said second end of said spool applying forces to said spool in said second direction.

9. A valve as defined in claim 8 wherein said housing includes a pilot fluid outlet and a pilot fluid circuit communicates with said pilot fluid outlet, said pilot fluid circuit comprising (i) a first fluid passage communicating said one outlet with said first end of said spool, (ii) a first orifice means in said first fluid passage, (iii) a second fluid passage communicating said first end of said spool with said second end of said spool, (iv) a second orifice means in said second fluid passage, (v) a third fluid passage communicating said second end of said spool with said pilot fluid outlet, and (vi) a third orifice means in said third fluid passage, said means communicating fluid pressure from the other outlet with said second end of said spool comprising a fourth fluid passage in said housing communicating said second outlet with said second fluid passage at a location that is downstream of said second orifice means, a fourth orifice means in said fourth fluid passage, a one-way check valve in said fourth fluid passage, said one way check valve allowing flow from said second outlet to said second passage but blocking flow from said second passage to said second outlet.

* * * * *